(12) United States Patent
Landon

(10) Patent No.: US 10,058,033 B2
(45) Date of Patent: Aug. 28, 2018

(54) RAKE WITH SHIFTABLE CROSS MEMBER

(75) Inventor: Gregory L. Landon, Shawano, WI (US)

(73) Assignee: H & S Manufacturing Co., Inc., Marshfield, WI (US)

( * ) Notice: Subject to any disclaimer, the term of this patent is extended or adjusted under 35 U.S.C. 154(b) by 288 days.

(21) Appl. No.: 13/075,858

(22) Filed: Mar. 30, 2011

(65) Prior Publication Data

US 2012/0247079 A1    Oct. 4, 2012

(51) Int. Cl.
*A01D 78/14* (2006.01)
*A01D 80/00* (2006.01)

(52) U.S. Cl.
CPC ......... *A01D 78/144* (2013.01); *A01D 80/005* (2013.01)

(58) Field of Classification Search
CPC .. A01D 80/005; A01D 78/142; A01D 78/144; A01D 7/146; A01D 78/1007
USPC .................................................. 56/365–398
See application file for complete search history.

(56) References Cited

U.S. PATENT DOCUMENTS

| | | |
|---|---|---|
| 2,222,840 A | 11/1940 | Holmes |
| 2,636,335 A | 4/1953 | Whitney |
| 2,658,324 A | 11/1953 | Johnson |
| 2,827,754 A | 3/1958 | Hill |
| 2,906,351 A | 9/1959 | Johnson |
| 2,922,269 A | 1/1960 | Van Der Lely et al. |
| 2,925,702 A | 2/1960 | Plant |
| 2,982,081 A | 5/1961 | Cooley |
| 2,994,179 A | 8/1961 | Vab Der Lely et al. |
| 3,031,834 A | 5/1962 | Van Der Lely et al. |
| 3,038,291 A | 6/1962 | Van Der Lely et al. |
| 3,108,424 A | 10/1963 | Van Der Lely et al. |
| 3,221,484 A | 12/1965 | Van Der Lely |
| 3,267,656 A | 8/1966 | Van Der Lely |
| 3,466,860 A | 9/1969 | Winkel et al. |
| 3,667,200 A | 6/1972 | Pool et al. |
| 3,967,684 A | 7/1976 | Haverdink |
| 3,977,166 A | 8/1976 | Delgado |
| 4,040,490 A | 8/1977 | Anderson |

(Continued)

FOREIGN PATENT DOCUMENTS

| | | |
|---|---|---|
| GB | 1073008 | 6/1967 |
| NL | 6413167 | 5/1965 |

OTHER PUBLICATIONS

Tonutti Farm Machinery Industries, Operator's Manual and Part List—Carted Hayrake, prior to Jun. 23, 2000, 54 pages.

(Continued)

*Primary Examiner* — John Weiss
(74) *Attorney, Agent, or Firm* — Patterson Thuente Pedersen, P.A.

(57) ABSTRACT

The present invention is a rake, comprising a tongue assembly and a wheel assembly operably coupled to the tongue assembly and being rotationally shiftable relative to the tongue assembly and the wheel assembly mounting a pair of rake assemblies. Each of the pair of rake assemblies is disposable in a generally horizontal disposition when the rake is in a transport disposition, the generally horizontal disposition being effected in part by the rotational shifting of the wheel assembly when transitioning between a working disposition and the transport disposition. The present invention is further a method of disposing the aforementioned rake in the transport disposition.

16 Claims, 10 Drawing Sheets

(56) References Cited

U.S. PATENT DOCUMENTS

| | | |
|---|---|---|
| 4,077,189 A | 3/1978 | Hering |
| 4,078,366 A | 3/1978 | Carmichael |
| 4,183,198 A | 1/1980 | Sligter |
| 4,214,428 A | 7/1980 | Caraway |
| 4,231,218 A | 11/1980 | Delgado |
| 4,245,458 A | 1/1981 | Smith |
| 4,315,546 A | 2/1982 | Fahrenholz |
| 4,496,003 A | 1/1985 | Bynum |
| 4,570,722 A | 2/1986 | Osborn |
| 4,723,401 A | 2/1988 | Webster et al. |
| 4,723,402 A | 2/1988 | Webster et al. |
| 4,723,403 A | 2/1988 | Webster |
| 4,753,063 A | 6/1988 | Buck |
| 4,785,614 A | 11/1988 | Schoenherr |
| 4,790,389 A | 12/1988 | Adee et al. |
| 4,840,233 A | 6/1989 | Friggstad et al. |
| 4,932,197 A | 6/1990 | Allen |
| 4,947,631 A | 8/1990 | Kuehn |
| 4,974,407 A | 12/1990 | Rowe et al. |
| 4,977,734 A | 12/1990 | Rowe et al. |
| 5,025,616 A | 6/1991 | Moss |
| 5,062,260 A | 11/1991 | Tonutti |
| 5,065,570 A | 11/1991 | Kuehn |
| 5,146,736 A | 9/1992 | Tonutti |
| 5,155,986 A | 10/1992 | Kelderman |
| 5,177,945 A | 1/1993 | Tonutti |
| 5,199,252 A | 4/1993 | Peeters |
| 5,203,154 A | 4/1993 | Lesher et al. |
| 5,231,829 A | 8/1993 | Tonutti |
| 5,263,306 A | 11/1993 | Tonutti |
| 5,305,590 A | 4/1994 | Peeters |
| 5,313,772 A | 5/1994 | Tonutti |
| 5,493,853 A | 2/1996 | Tonutti |
| 5,540,040 A | 7/1996 | Peeters |
| 5,598,691 A | 2/1997 | Peeters |
| 5,615,545 A | 4/1997 | Menichetti |
| 5,685,135 A | 11/1997 | Menichetti |
| 5,740,870 A | 4/1998 | Rodgers et al. |
| 5,752,375 A | 5/1998 | Tonutti |
| 5,899,055 A | 5/1999 | Rowse et al. |
| 6,000,207 A | 12/1999 | Menichetti et al. |
| 6,038,844 A | 3/2000 | Peeters et al. |
| 6,105,354 A | 8/2000 | Luhn et al. |
| 6,272,825 B1* | 8/2001 | Anderson et al. .............. 56/341 |
| 6,272,826 B1* | 8/2001 | Menichetti ......... A01D 78/1007 56/367 |
| 6,314,710 B1 | 11/2001 | Tonutti |
| 6,405,517 B1* | 6/2002 | Peeters ................ A01D 78/144 172/311 |
| 6,467,249 B2 | 10/2002 | Demanet |
| 6,865,873 B2 | 3/2005 | Menichetti |
| 7,165,386 B2 | 1/2007 | Tonutti |
| 7,318,312 B2 | 1/2008 | Cicci et al. |
| 7,328,567 B2 | 2/2008 | Kappel et al. |
| 7,367,175 B2 | 5/2008 | Scott |
| 7,584,595 B2 | 9/2009 | Marggi et al. |
| 7,849,933 B2 | 12/2010 | Marggi |
| 2002/0090984 A1* | 7/2002 | Horejsi et al. ................ 460/119 |
| 2004/0079066 A1* | 4/2004 | Luchetti .......................... 56/384 |
| 2004/0107687 A1* | 6/2004 | Magnini ............... A01D 78/144 56/377 |
| 2005/0210856 A1 | 9/2005 | Menichetti |
| 2010/0032924 A1* | 2/2010 | Menichetti ........... A01D 78/144 280/638 |
| 2013/0160421 A1* | 6/2013 | Tonutti ................. A01D 78/001 56/377 |

OTHER PUBLICATIONS

Kelderman Manufacturing, Inc., KRC-III Rake Caddy brochure, prior to Jun. 23, 2000, 1 page.
Rowse V-Rake brochure, prior to Jun. 23, 2000, 2 pages.
Kelderman Manufacturing, Inc., KSR16 and KSR20 Wheel Stretch Rakes brochure, prior to Jun. 23, 2000, 2 pages.
Enorossi, Harvestman "V" Rake, Hay Line Machines brochure, prior to Jun. 23, 2000, 1 page.
Enoagricola Rossi, "Harvestman" the new Enorossi "V" rake brochure, prior to Jun. 23, 2000, 2 pages.
Sitrex Agricultural Machinery, H90 Carted Rake V brochure, prior to Jun. 23, 2000, 2 pages.
Sitrex Agricultural Machinery, Mounted side-delivery rake brochure, prior to Jun. 23, 2000, 4 pages.
Sitrex Agricultural Machinery, RP6 RP12 Mounted Side-Delivery Rake brochure, prior to Jun. 23, 2000, 2 pages.
Kelderman Manufacturing, Inc., Kelderman Open Wheel Rakes brochure, prior to Jun. 23, 2000, 1 page.
Kalona Machine Shop, The Original V Rake on Wheels brochure, prior to Jun. 23, 2000, 2 page.
Tigerco Dist. Co., E-Z V-Rake Cart brochure, prior to Jun. 23, 2000, 1 page.
Vicon, Crop-driven fingerwheel rakes brochure, 6 pages.
Vicon, High capactity rakes RH 600-720 brochure, 4 pages.
H&S Manufacturing Co. Inc., H&S Trailer Model "V"-Rake brochure, 2 pages.
Sitrex Agricultural Machinery, Recommended Spare Parts List RP/6-RP/12, 2 pages.
Sitrex Agricultural Machinery rake brochure, 1 page.
Sitrex Agricultural Machinery, H94 V Rake Cart brochure, 1 page.

* cited by examiner

RAKE WITH SHIFTABLE CROSS MEMBER

TECHNICAL FIELD

The present invention is related to an agricultural rake for raking a mown crop. More particularly, the rake of the present invention is utilized for raking a mown crop into a windrow.

BACKGROUND OF THE INVENTION

It is desirable that a windrowing rake have the greatest possible clearance between the underside of the rake structural components and the underlying ground/mown hay when the rake is in an working/raking disposition so that the mown crop is not disturbed by passage of the rake support components. Additionally, it is desirable that when the rake is in a folded transport disposition, that the envelope displaced by the rake be as low as possible with respect to the underlying ground so as to clear overhanging obstacles and also be as small as possible.

The rake of the present invention substantially meets the aforementioned needs of the industry. To effect this, the rake of the present invention has a wheel assembly that is pivotable relative to a tongue assembly of the rake. Accordingly, when the rake is in the working or raking disposition, the wheel assembly is forwardly pivoted relative to the tongue assembly such that the wheel assembly is more directly beneath the tongue assembly. In such disposition, the wheel assembly is effective in elevating the rear portion of the tongue assembly above the underlying ground/crop. When the rake is transitioned into the transport disposition, the wheel assembly is rearwardly pivoted relative to the tongue assembly such that the wheel assembly is relatively less directly beneath the tongue assembly. In such disposition, the wheel assembly is effective in dropping the rear portion of the tongue assembly relative to the underlying ground. Further, the rearward rotational shifting of the wheel assembly acts to shift the rake assemblies into a generally horizontal disposition, such disposition minimizing the envelope displaced by the rake and making the rake as low as possible with respect to the underlying ground so as to clear overhanging obstacles.

SUMMARY OF THE INVENTION

The present invention is a rake, comprising a tongue assembly and a wheel assembly operably coupled to the tongue assembly and being rotationally shiftable relative to the tongue assembly and the wheel assembly mounting a pair of rake assemblies. Each of the pair of rake assemblies is disposable in a generally horizontal disposition when the rake is in a transport disposition, the generally horizontal disposition being effected in part by the rotational shifting of the wheel assembly when transitioning between a working disposition and the transport disposition. The present invention is further a method of disposing the aforementioned rake in the transport disposition.

DETAILED DESCRIPTION OF THE DRAWINGS

The rake of the present invention is shown generally at 10 in the figures. The rake 10 has four major components; tongue assembly 20, rake assemblies 22, 24, and wheel assembly 26.

Figure 1:
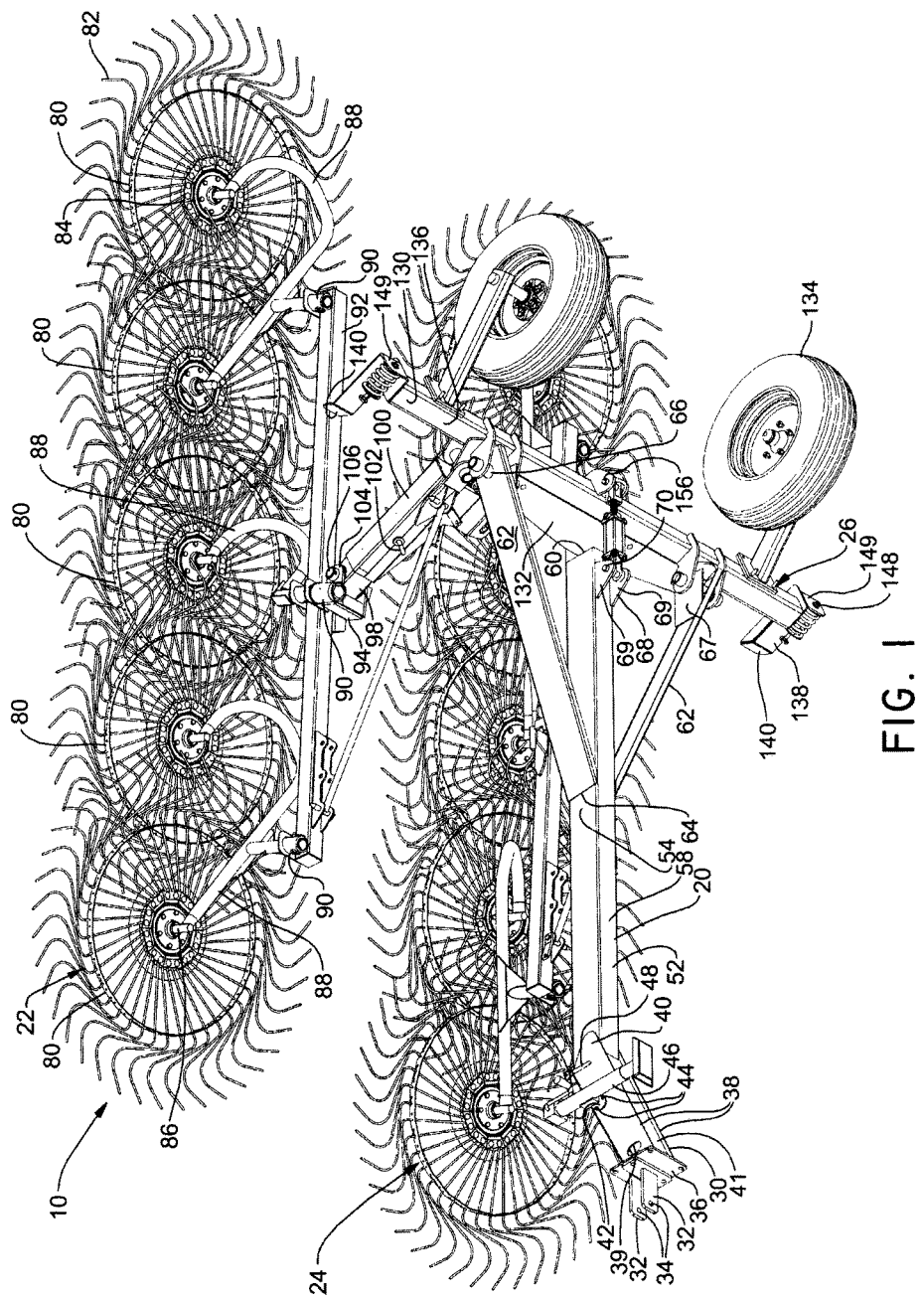
FIG. 1 is an underside perspective view of the rake of the present invention in the transport disposition.

Referring to FIG. 1, the tongue assembly 20 of the rake 10 is depicted with the proximal end 30 thereof at the left side of the depiction. A pair of coupler bars 32 project leftward and are disposed spaced apart and one on top of the other. Pin bores 34 are defined in the coupler bars 32. The pin bores 34 are preferably disposed in registry with one another, such that a pin (not shown) can be disposed therein for coupling of the rake 10 to a towing vehicle, such as a tractor or pickup truck.

The coupler bars 32 are affixed as by bolting or welding to an end plate 36. The end plate 36 is disposed orthogonal with respect to the longitudinal dimension of the coupler bars 32. The end plate 36 is affixed to angularly depending struts 38 as by welding. Each of the struts 38 has an oval bore 39 defined therein proximate the end plate 36. Each of the depending struts 38 additionally has a strut ear 40. Each of the strut ears 40 is disposed alongside a respective side 54 of a tongue shank 52 (described in more detail below) that may be affixed thereto as by welding. The structural integrity of the depending struts 38 is enhanced by spaced apart, generally parallel plates 41 (see also FIG. 2) that are affixed to the depending struts 38 as by welding.

A tubular jack receiver 42 is affixed to the outside margin of the leftmost depending strut 38. The jack receiver 42 is preferably tubular, having a circular cross section and has two pairs of orthogonally disposed bores 44 defined therein.

A jack 46 may be coupled to the jack receiver 42 by means of a coupler 47. The coupler 47 is typically tubular in shape and has an outer diameter that is slightly smaller than the inner diameter of the jack receiver 42 such that the coupler 47 may be inserted within the jack receiver 42. The coupler 47 has a pair of orthogonally disposed bores (not shown) that may be brought into registry with either of the two pairs of orthogonally displaced bores 44 on the jack receiver 42. A jack pin 48 may then be passed through the pair of the orthogonally displaced bores 44 in registry with the orthogonally displaced bores defined in the coupler 47 in order to removably couple the jack 46 to the rake 10.

As noted above, the shank 52 of the tongue assembly 20 is coupled at the proximal end to the depending struts 38. The tongue shank 52 is preferably defined by a rectangular tube, having opposed sides 54 and an opposed top 56 and bottom 58. The tongue shank 52 terminates at distal end 60. A pair of trailing arms 62 are angularly disposed, one arm 62 being on either side of the tongue shank 52. Each of the trailing arms 62 extends rearward at an angle of between 10 and 40 degrees with respect to the longitudinal axis of the tongue shank 52. Each of the respective trailing arms 62 has a fixed coupling 64 at the leading edge thereof, the fixed coupling 64 fixedly couples the respective trailing arm 62 to a respective side 54 of the tongue shank 52, as by welding. A bore 66 is defined in each of the respective trailing arms 62 proximate the distal end thereof. Each of the trailing arms 62 is preferably made of solid metallic material having a generally rectangular cross-sectional shape.

Each of the trailing arms 62 has a trailing arm gusset 67 fixedly coupled thereto proximate the distal end of the respective trailing arm 62. The trailing arm gusset 67 is generally parallelly disposed with respect to a respective side 54 of the tongue shank 52. Each of the trailing arm gussets 67 has a gusset bore 73 defined therein that is in registry with the bore 66.

A bracket 68 is fixedly coupled to the bottom 58 of the tongue shank 52 proximate the distal end of the tongue shank 52. The bracket 68 has a pair of spaced apart bracket members 69. Each of the respective bracket members 69 has a bore 70 defined therein.

Turning now to the rake assemblies 22, 24 of the rake 10, each of the rake assemblies 22, 24 has a plurality of rake members 80. In the preferred embodiment depicted, each of the rake assemblies 22, 24 has five rake members 80. More or fewer rake members 80 can be readily added or subtracted as needed.

Each of the rake members 80 has a plurality of radially extending tines 82 that are radially disposed with respect to a hub 84. The rake members 80 are not powered, but rotate responsive to forces imparted to the rake members 80 by contact with the underlying ground during raking operations. The hub 84 is rotationally borne on an axle 86 for this purpose.

Each of the axles 86 is supported on a support arm 88. Preferably, the leading and trailing support arms 88 of the respective rake assemblies 22, 24 each support two rake members 80 while the central support arm 88 supports a single rake member 80. Each of the support arms 88 is pivotally coupled to a respective support beam 92 by means of a pivotable mount 90. Preferably, the respective support arms 88 are free to pivot with respect to the respective pivotable mount 90.

Figure 5:
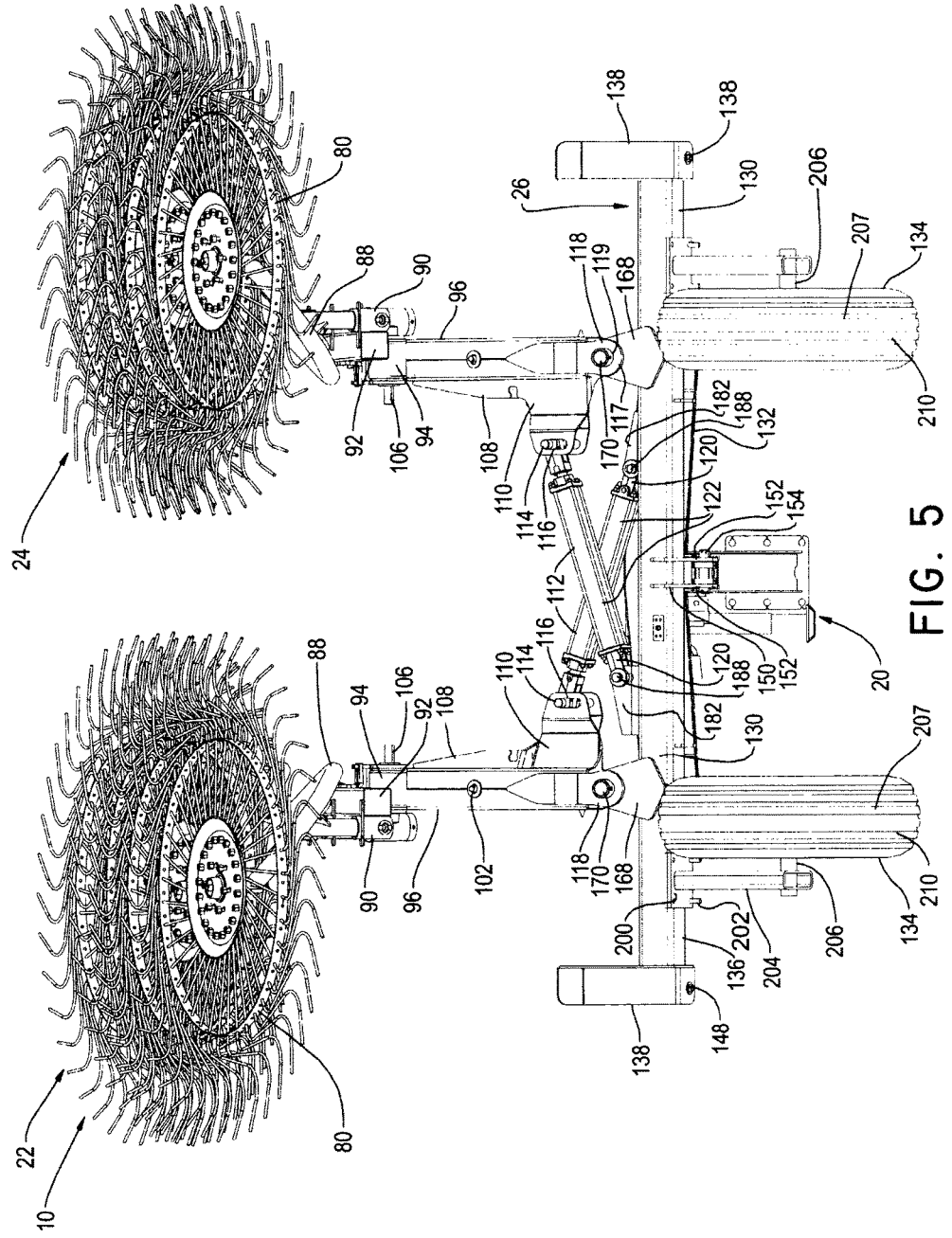
FIG. 5 is a rear elevational view of the rake in the transport disposition.

The support beam 92 is preferably an elongate member formed of a tube having a rectangular cross-section. The support beam 92 is pivotally coupled to an extendable arm 96 by a pivotable mount 94, as depicted in FIG. 5. The pivotable mount 94 includes a pin 106 that effects the pivotable coupling between the support beam 92 and the extendable arm 96. Accordingly, the support beam 92 is free to pivot about the longitudinal axis of the pin 106.

The extendable arm 96 has an inner rectangular tube 98 and an outer rectangular tube 100, the relative disposition of which determines the selected length of the extendable arm 96. The inner rectangular tube 98 has a plurality of pairs of opposed bores defined therein along the longitudinal axis thereof. The outer rectangular tube 100 has a single pair of opposed bores defined therein. By sliding the inner rectangular tube 98 relative to the outer rectangular tube 100 until a selected pair of bores defined in the inner rectangular tube 98 is in registry with the pair of bores defined in the outer rectangular tube 100, a pin 102 may be inserted through the above-mentioned bore to fix the length relationship of the inner rectangular tube 98 to the outer rectangular tube 100 and thereby to fix the overall length of the extendable arm 96.

Figure 4:
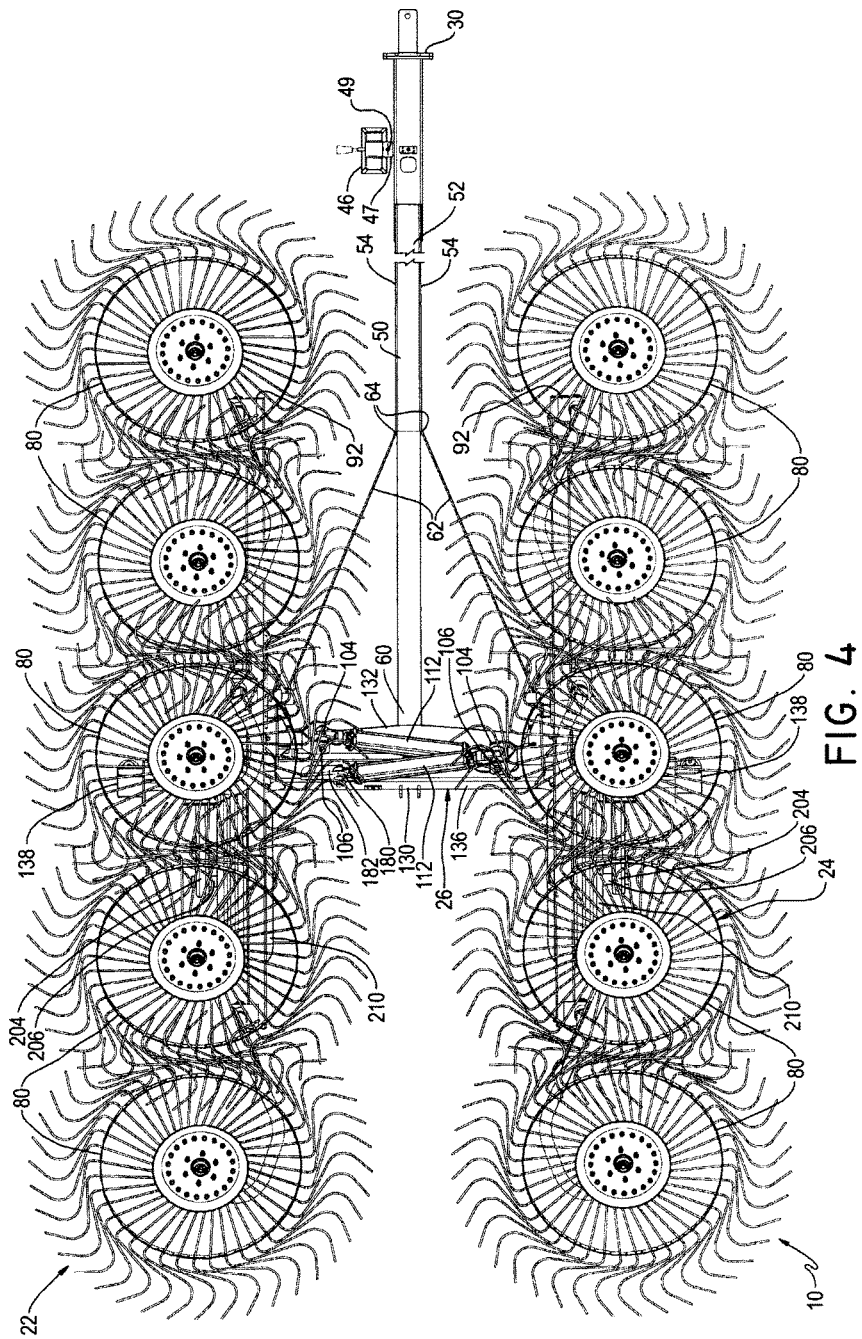
FIG. 4 is a top planform view of the rake in the transport disposition.

As depicted in FIG. 5. a gusset 108 is provided along the inner margin of the respective extendable arms 96. A shifting bracket 110 is further provided on the inner margin of the respective extendable arms 96 at an end of the gusset 108. The shifting bracket 110 is provided for coupling the respective extendable arm 96 to a respective spread actuator 112. In order to effect the coupling to the spread actuator 112, a pin 114 may be disposed in an elongate bore 116 defined in the shifting bracket 110. The pin 114 in addition to passing through the elongate bore 116 passes through a bore (not shown) defined in the end of the spread actuator 112. The spread actuator 112 is preferably a hydraulic actuator having a piston 120 that is translatable within a cylinder 122 responsive to porting of hydraulic pressure to either side of the piston 120. Extension and retraction of the spread actuator 112 effects the shifting of the support beam 92 to which the respective spread actuator 112 is coupled between the transport disposition (see FIG. 4) in which the two support beams 92 are in a generally parallel horizontal disposition and the working disposition (see FIGS. 8 and 9) in which the two support beams 92 are in a generally V disposition with respect to one another.

The extendible arm 96 terminates in a bracket 118, the bracket 118 having a pair of spaced apart bracket members 117. Each of the bracket members 117 has a bore 119 defined therein, the two bores 119 being in registry.

Figure 1A:
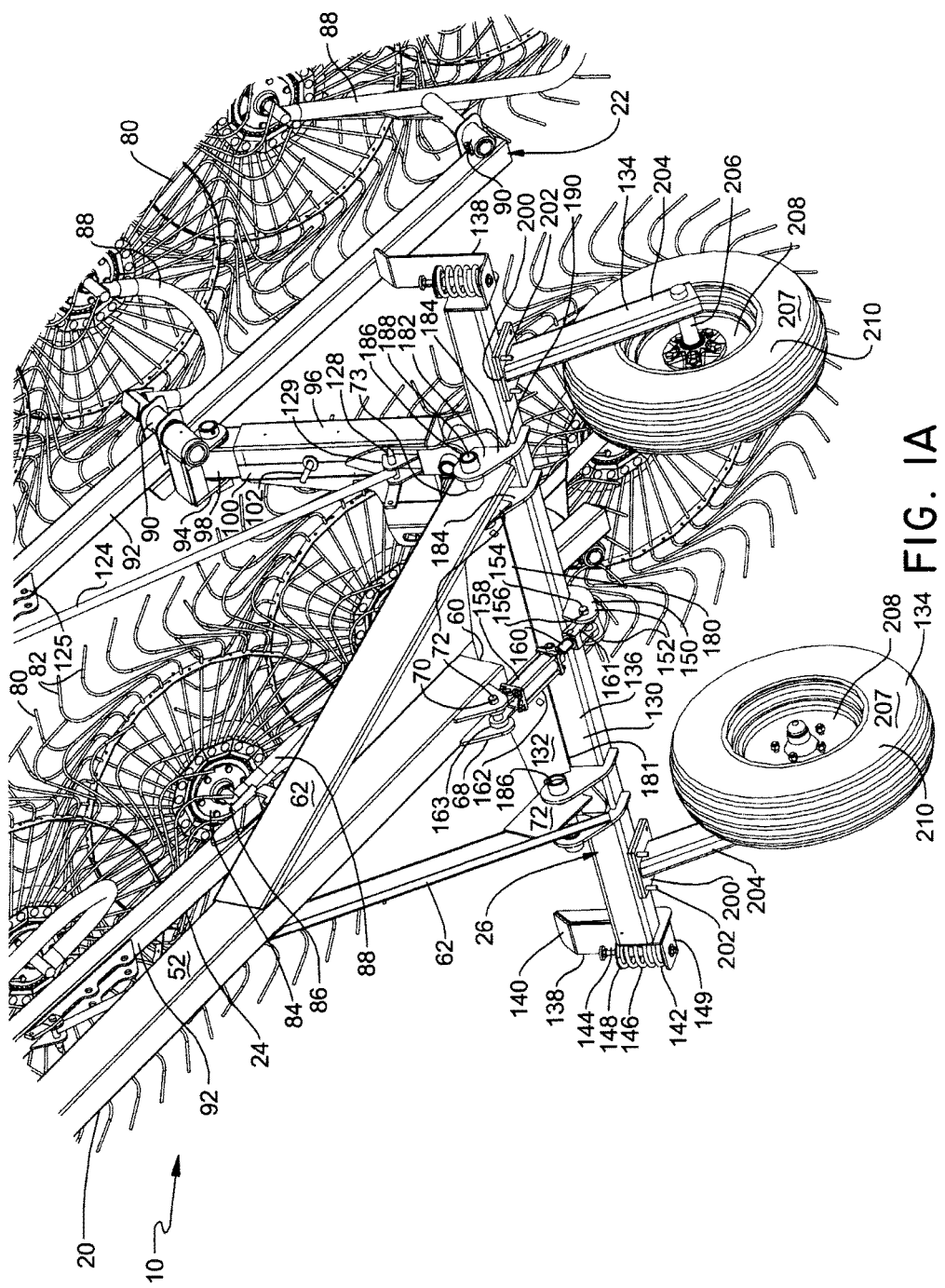
FIG. 1a is an enlarged depiction of the wheel assembly as depicted in FIG. 1.
Figure 2:
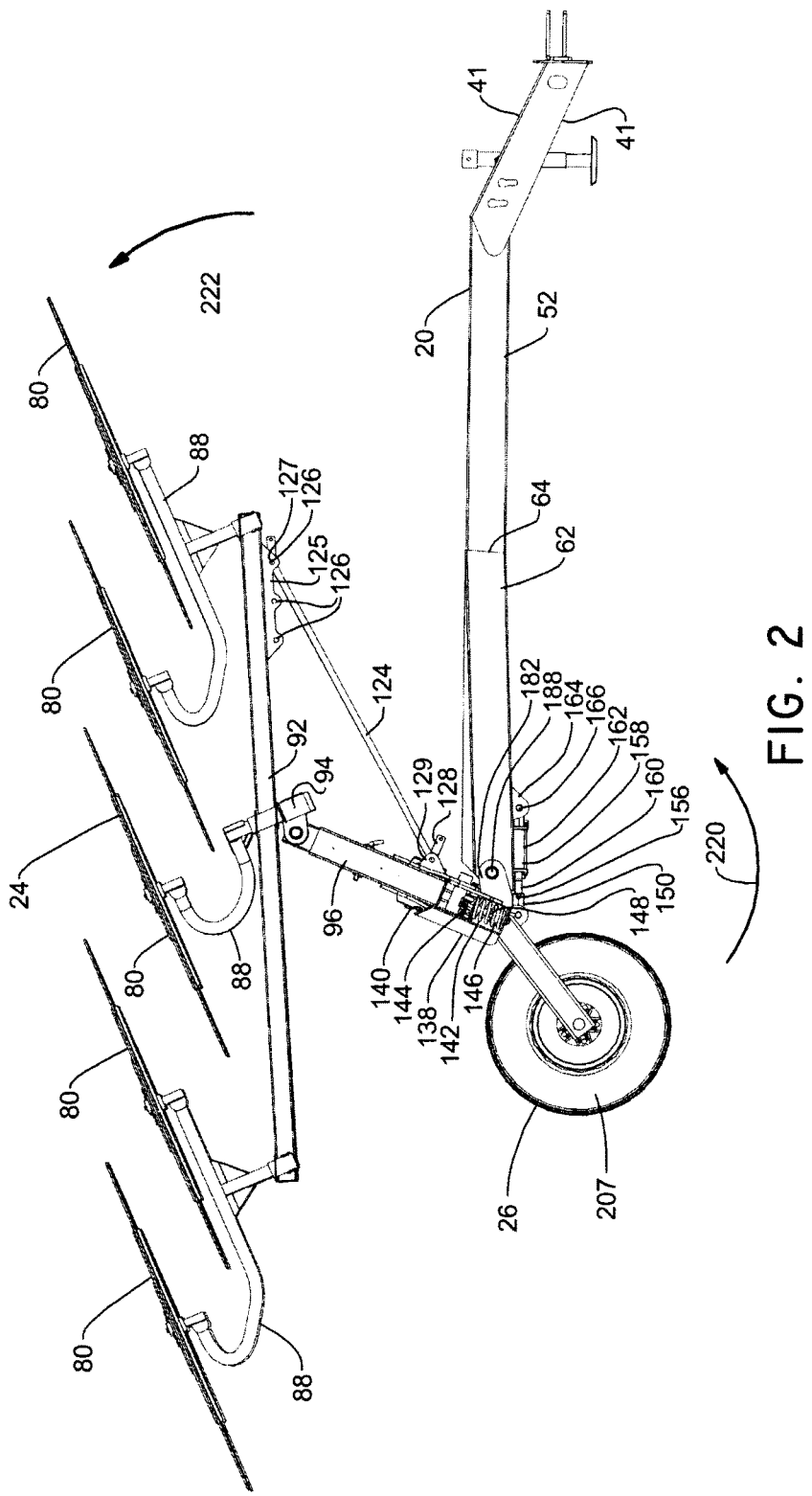
FIG. 2 is a side elevational view of the rake in the transport disposition.
Figure 3:
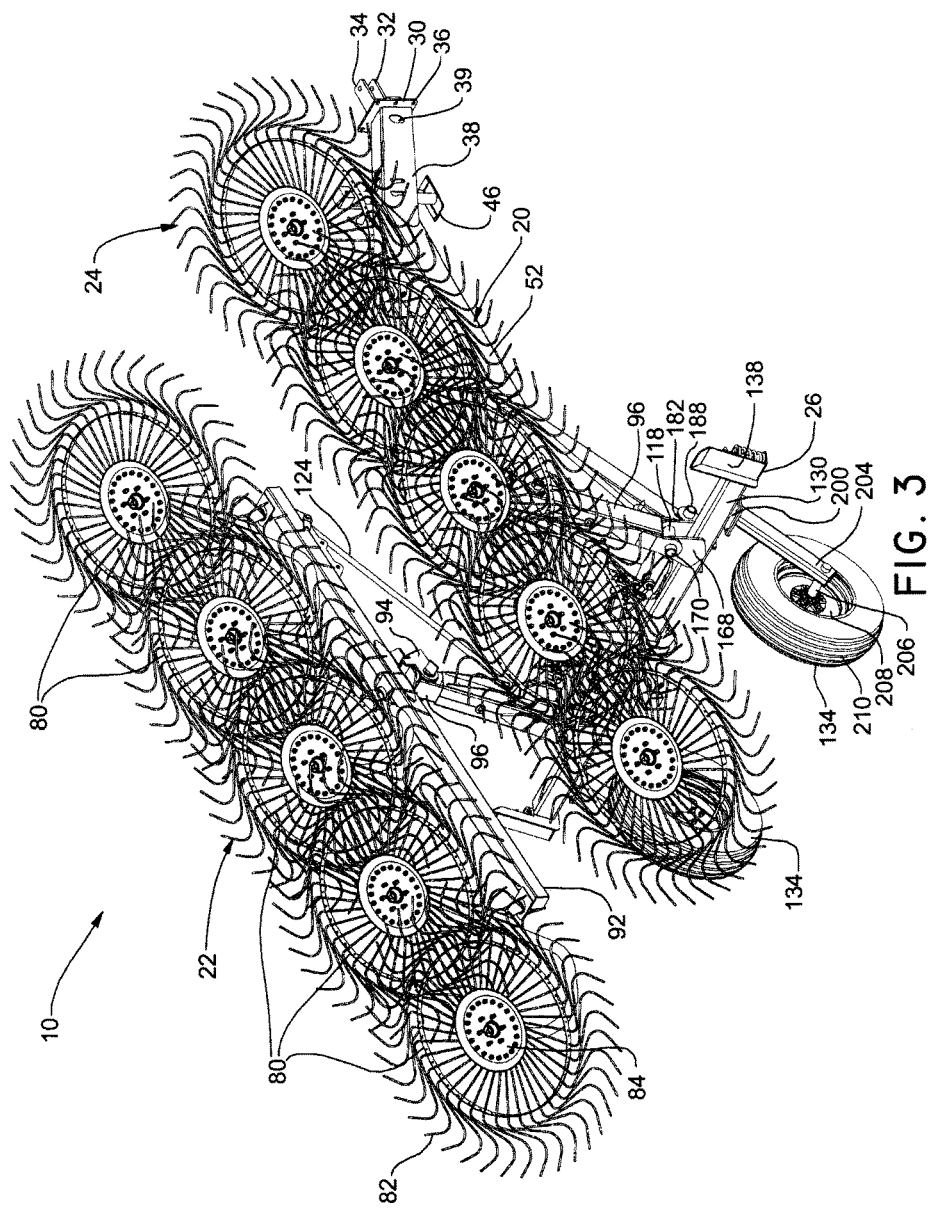
FIG. 3 is a perspective view of the rake in the transport disposition taken from above and rearward of the rake.
Figure 8:
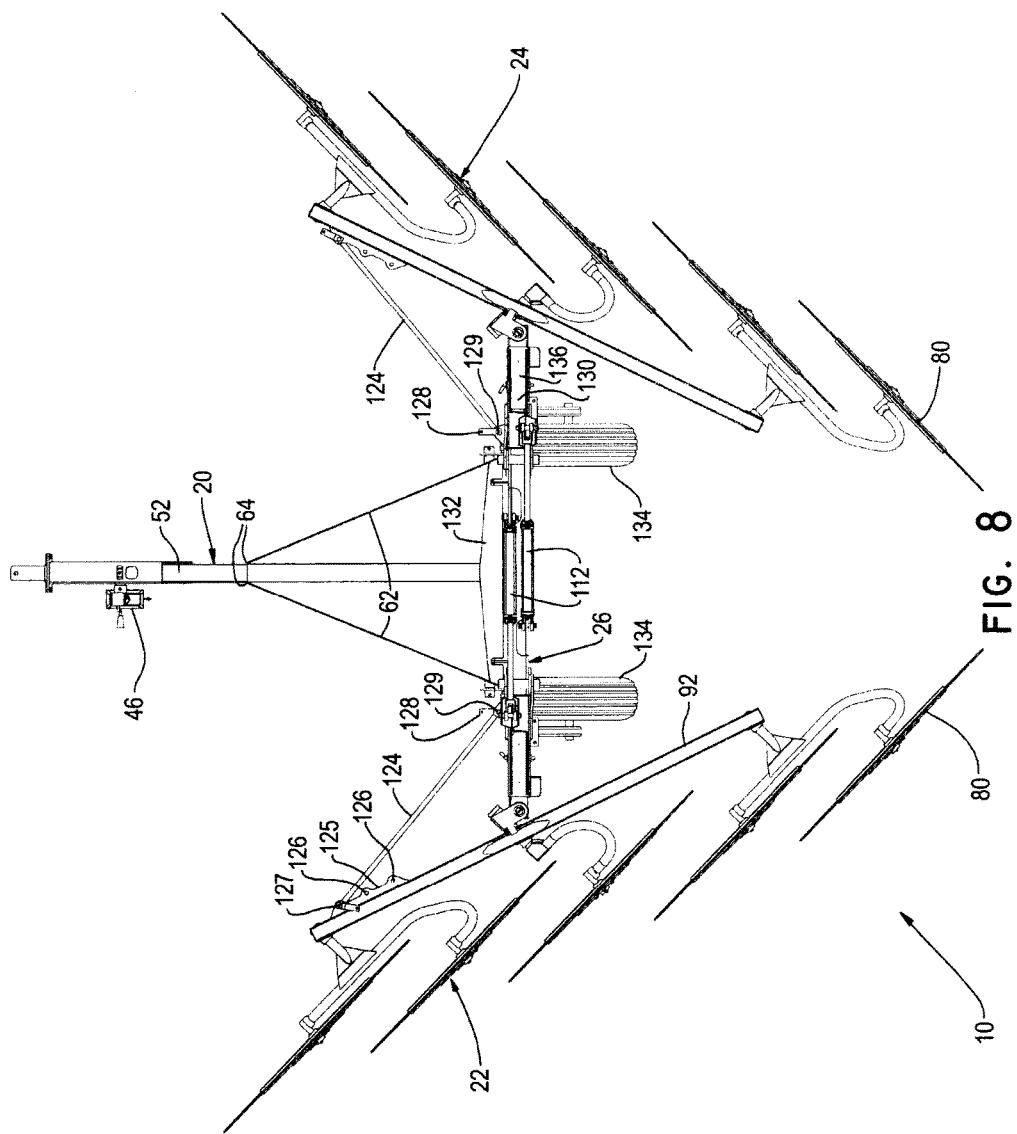
FIG. 8 is a top planform view of the rake in the working disposition.

As depicted in FIGS. 2 and 8, a pair of spread adjusting arms 124 is included to adjust the spread of the V shape assumed by the respective rake assemblies 22, 24 relative to one another, thereby defining the width of the windrow being formed by the rake 10 as it advances through a mown field. The spread of the V shape also determines the width of the swath that is raked in a pass through a mown field. Spread adjusting arms 124 are depicted in FIG. 2 when the rake is in the folded disposition and in FIG. 8 in the working disposition. A first end of the spread adjusting arms 124 is pivotally coupled to an adjusting bracket 125. The adjusting bracket 125 is affixed as by welding to the support beam 92. The adjusting bracket 125 has a plurality of pin bores 126 spaced apart along the length dimension of the adjusting bracket 125. In the depiction of FIGS. 2 and 8, a pin 127 is disposed in the pin bore 126 that is closest to the end of the support beam 92. The second end of the spread adjusting arm 124 is pivotally coupled by a pin 128 to a bracket 129. A bracket 129 is affixed near the proximal end of the respective extendable arms 96 on the inward directed face thereof. See FIG. 1a. It can be seen that by coupling the spread adjusting arms 124 to the support beam 92 by means of the pin bore 126 that is furthest from the end of the support beam 92 act to increase the relative angle defined between the two support beams 92. Such action will bring the two trailing rake members 80 closer together causing the crop that is being raked to be brought into a narrower windrow.

Finally, a strengthening gusset member 132 is transversely disposed and is fixedly coupled to the trailing arms 62 and to the distal end 60 of the tongue 20 to generally strengthen the structure that supports the wheel assembly 26. The gusset member 132 is preferably a plate 180 that extends generally transverse to the longitudinal axis of the tongue shank 52. It should be noted that there is clearance between the wheel assembly 26 and the trailing edge 181 of the plate 180 such that the wheel assembly 26 is free to rotate rearward of the plate 180, as is described in greater detail below.

Referring to FIGS. 1 and 1a, the fourth of the subcomponents of the rake 10, the wheel assembly 26, is depicted.

The wheel assembly 26 includes three members; the cross member 130 and the two respective wheel members 134.

The cross-member 130 is formed of a tube 136 having a rectangular cross-section. As depicted in FIG. 2 as well, a guide 138 is disposed at either end of the tube 136. The guide 138 is disposed transversely with respect to the tube 136 and includes a forward facing slanted face 140. The guide 138 includes a biased support 142. The biased support 142 includes a support plate residing on the top surface of a coil spring 146. A central bolt extends through a bore defined in the support plate 144 and centrally through the spring 146 and through a bore defined in the plate 149 that supports the spring 146.

As depicted particularly in FIG. 5, a centrally disposed shift bracket 150 is affixed to the tube 136. The shift bracket 150 has two spaced apart side members 152. Each of the side members having a transverse bore 156 defined therein, each of the bores 156 being in registry. A pin 154 may be disposed in the bores 156 and engaging a shift actuator 158.

The shift actuator 158 is preferably a hydraulic cylinder having a piston 160 and a cylinder 162. Piston 160 has a coupler 161 that is captured within the shift bracket 150 by the pin 154. The cylinder 162 includes a coupler 163 that is captured within the bracket 68 by means of a pin 72 that is passed through the bores 70 and through a bore defined in the coupler 163.

As depicted in FIG. 5, a pair of spaced apart mounts 168 are disposed on the cross member 136. The mounts 168 are generally upward directed. Each of the respective mounts 168 has a bore (not shown) defined therein that may be brought into registry with the bore 119 of the respective brackets 118. A pin 170 may be disposed in the above noted bores for pivotally coupling the extendable arm 96 to the cross member 130 thereto.

Figure 7:
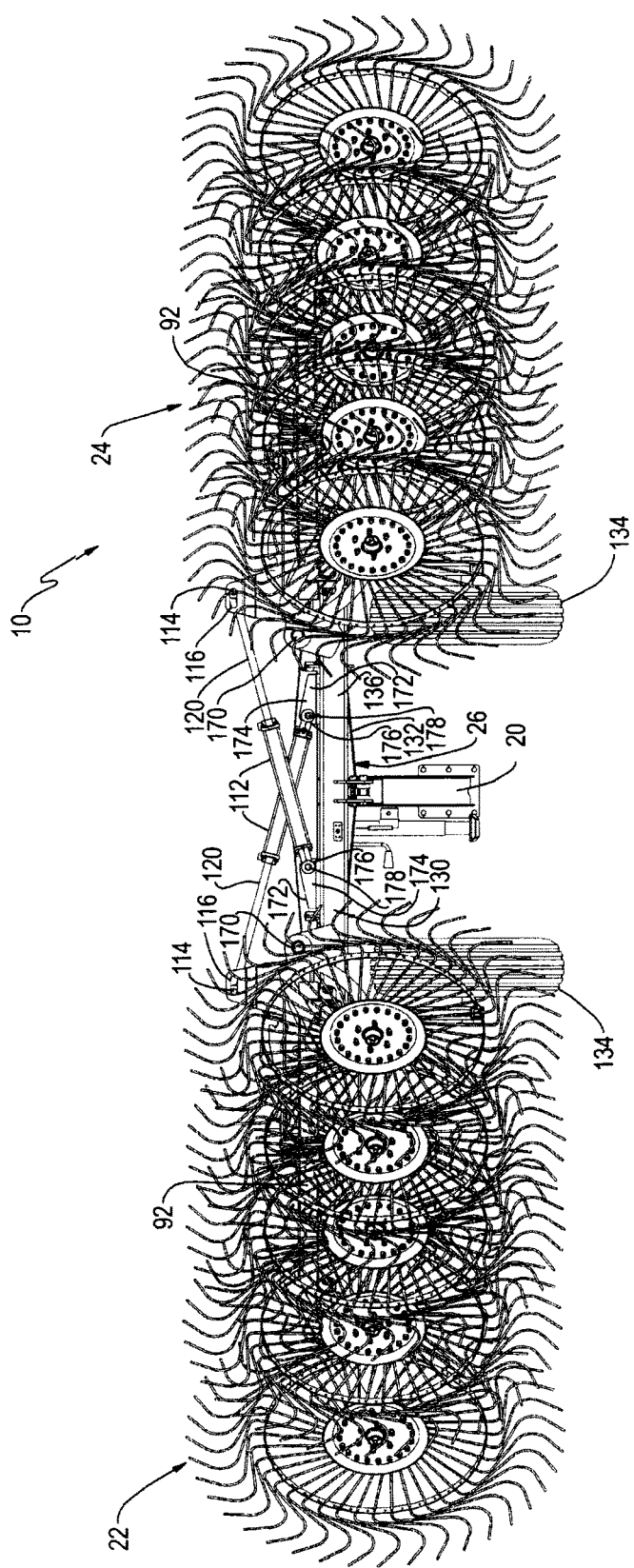
FIG. 7 is a rear elevational view of the rake in the working disposition.

Referring to FIG. 7, a pair of spaced apart spread brackets 172 are fixedly coupled to the tube 136 of the cross member 130. Each of the spread brackets 172 has a pair of spaced apart, generally parallel side members 174. Each of the side members 174 has a bore 176 defined therein, the bores 176 of a respective spread bracket 172 being in registry. A respective pin 178 may be passed through the bores 176 of a respective spread bracket to pivotally couple a distal end of a respective spread actuator 112 to the cross member 130.

A bracket 182 is disposed at either end of the plate 180, the respective brackets 182 being fixedly coupled to the tube 136. See FIG. 1a. Each of the brackets 182 has a pair of spaced apart bracket side members 184. The bracket side members 184 are spaced far enough apart such that the distal end of the trailing arm 62 and the respective trailing arm gusset 72 may reside between the bracket side members 184 of a selected bracket 182. Each of the bracket side members 184 has a bore 186 defined therein. The respective bores 186 may be brought into registry with the gusset bore 73 defined in the gusset 72 and the bore 70 defined proximate the distal end of the respective trailing arms 62. A pin 188 may be passed through the aforementioned bores to pivotally couple the wheel assembly 26 to each of the trailing arms 62. The bracket side members 184 each include an L-shaped coupler 190 that is fixedly mated to the rectangular tube 136 of the cross member 130 and affixed thereto as by welding. The wheel assembly 26 pivots about the pin 188 when the rake 10 transitions between the transport and the working dispositions.

As depicted in FIG. 1a, the wheel assembly 26 further includes two wheel members 134. Each of the wheel members 134 includes a mount 200, being a generally rectangular plate. A plurality of bores are defined in the mount 200 and the mount 200 may be affixed to the cross member 130 by means of a U bolt and nuts 202, bolts, or by welding, as desired. A generally depending arm 204 extends from the mount 200 and includes at it distal end a stub axle 206. A wheel 207 is rotatably born on the stub axle 206. Each of the wheels 207 includes a rim 208 mounting an inflatable tire 210.

Figure 6:
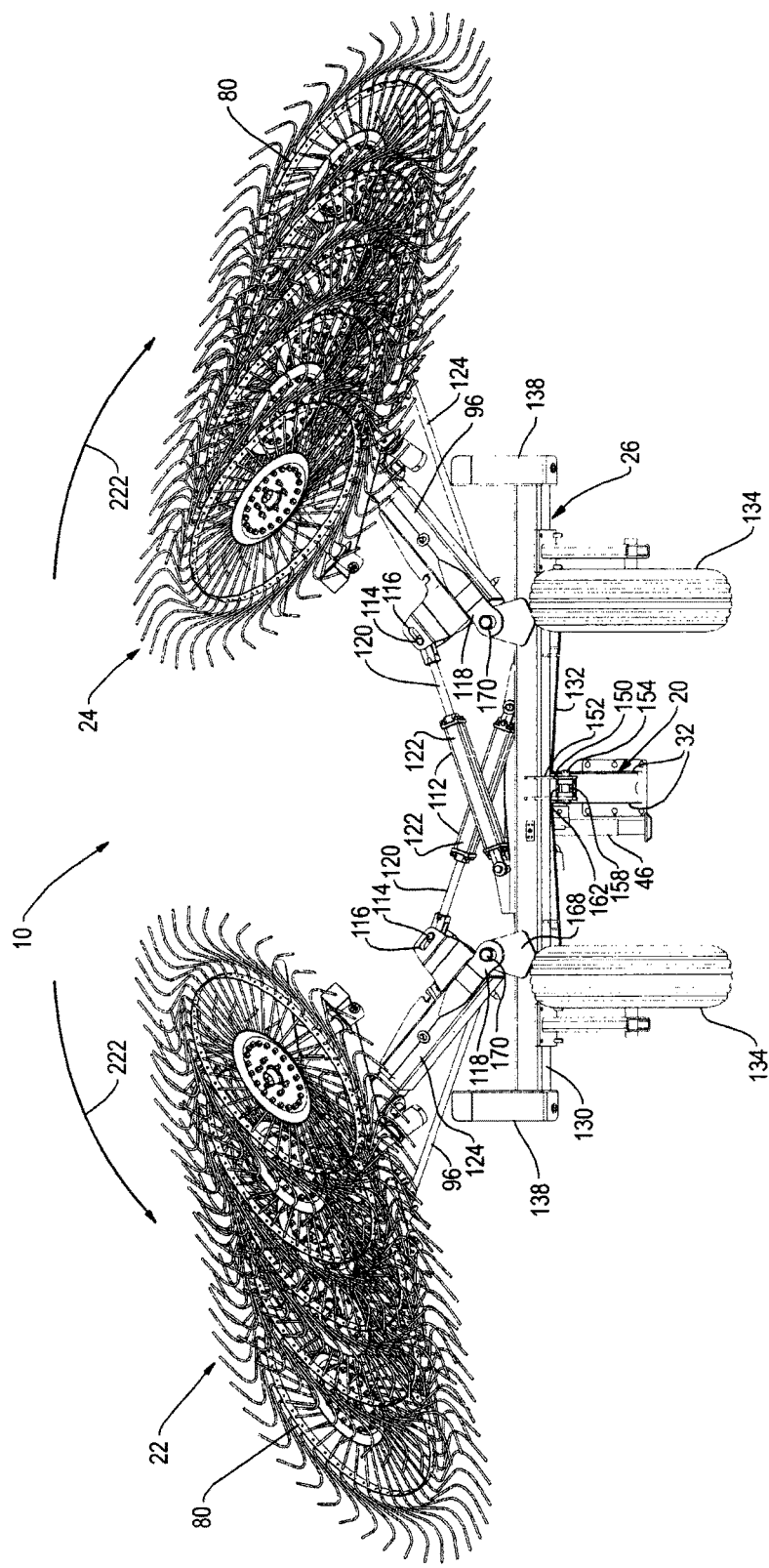
FIG. 6 is a rear elevational view of the rake in transition midway between the transport disposition and the working disposition.
Figure 9:
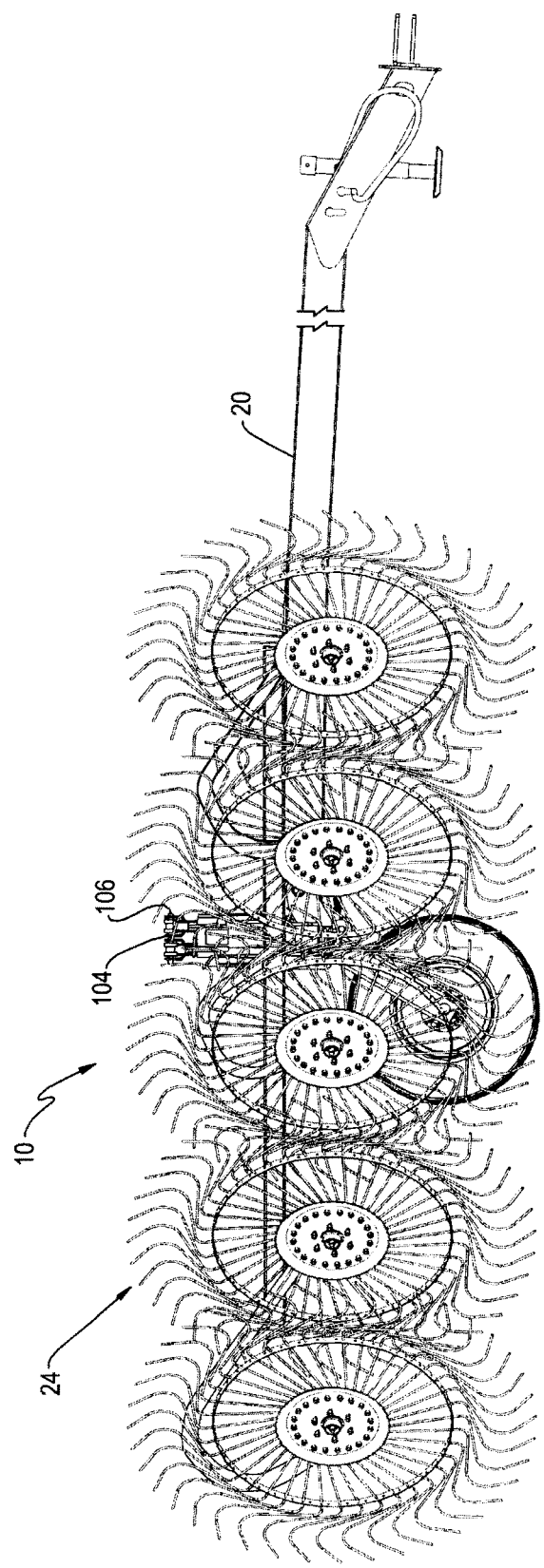
FIG. 9 is a side elevation of the rake in the working disposition.

The operation of the rake 10 in shifting from the transport disposition to the working disposition is depicted sequentially in FIGS. 5-7. FIG. 5 depicts the transport disposition of the rake 10 with the tongue assembly 20 in its lowest disposition relative to the underlying ground. This can be detected by noticing that the tires 210 partially mask the cross member 130 of the wheel assembly 26. Such disposition acts to advantageously lower the overall envelop defined by the rake 10 when the rake 10 is being transported. In this disposition, the piston 160 of the shift actuator 158 is fully extended thereby rotationally shifting the wheel assembly 26 to its rearwardmost disposition. FIGS. 7-9 depict the working disposition of the rake 10 with the tongue assembly 20 in its highest disposition relative to the underlying ground. This can be detected by noticing that the tires 210 are disposed below the cross member 130 of the wheel assembly 26 and that the wheel assembly 26 is forward rotated relative to the tongue assembly 20. Such disposition acts to advantageously elevate the structure of the rake 10 above the underlying ground and any mown crop disposed on the ground. In this disposition, the piston 160 of the shift actuator 158 is fully retracted thereby rotationally shifting the wheel assembly 26 to its forwardmost disposition.

Shifting the rake 10 from the transport disposition to the working disposition is effected by porting hydraulic fluid to the respective spread actuators 112 and the shift actuator 158. Such porting may be done simultaneously to the respective spread actuators 112 and the shift actuator 158 such that the spread actuators 112 and the shifting actuator 158 commence actuation nearly simultaneously. Retracting the piston 160 of the shift actuator 158 acts to shift the wheel assembly 26 and the rake assemblies 22, 24, the rake assemblies 22, 24 being borne by the wheel assembly 26. Such action acts to rotate and elevate the forward end of the support beams 92, as indicated by the arrow 222 of FIG. 2. Such elevation occurs near simultaneously with the spreading of the rake assemblies 22, 24 that is caused by extending the pistons 120 of the respective spread actuators 112. Extending the pistons 120 of the respective spread actuators 112, acts to pivot the rake assemblies 22, 24 about the pin 170.

Commencing with FIG. 5, the rake 10 is in its transport disposition. Each of the extendable arms 96 is disposed in a generally upright disposition, defining an acute included angle with the tongue shank 52 of the tongue assembly (see in particular FIG. 2). Referring again to FIG. 2, the support beams 92 are in a generally parallel disposition with one another and each support beam 92 is in a generally parallel disposition with respect to the longitudinal axis of the tongue shank 52. Such disposition being advantageously generally horizontal to minimize the overall height of the rake 10. It should be noted that in FIG. 2, the rake assembly 22 is masked from view by the rake assembly 24.

Preferably, the shift actuator 158 and the two spread actuators 112 are serially hydraulically coupled such that hydraulic pressure is first ported to the shift actuator 158 and fluid exiting the shift actuator 158 is then simultaneously ported to the respective spread actuators 112. When shifting from the transport disposition of FIG. 5 to the working disposition of FIGS. 7-9, porting hydraulic fluid under pressure to the shift actuator 158 and the two spread actuators 112, acts to retract the piston 160 of the shifting actuator 158 and to extend the pistons 120 of the respective spread actuators 112. Retracting the piston 160 of the shifting actuator 158, acts to pivotally shift the wheel assembly 26 about the axis defined by the longitudinal axis of the two pins 188 in a manner as indicated by the arrow 220 of FIG. 2. The axis defined by the longitudinal axis of the two pins 188 is generally transverse to the longitudinal axis of the tongue shank 52 of the tongue assembly 20. Simultaneously, the rake assemblies rotate about the longitudinal axis of the respective pins 170 (FIG. 5) while the longitudinal axis of the respective pins 170 is being tilted by the pivotal shifting of the wheel assembly 26. It is the tilting of the longitudinal axis of the respective pins 170 that brings the two rake assemblies into the generally horizontal disposition during transition of the rake 10 into the transport disposition. With the rake 10 being held in position, the wheels 207 rotate along the ground from the position depicted in FIGS. 2 and 5 through the transitory disposition of FIG. 6 to the disposition of FIGS. 7-9. As noted in FIGS. 5-7 and 9, the wheels 207 are drawn up more beneath the tongue assembly 20, thereby elevating the tongue assembly 20 (and thereby, the cross member 130) with respect to the ground as the disposition of FIG. 7 is attained. During this shifting, the rake assemblies 22, 24, being coupled to the wheel assembly 26, also rotate as indicated by the arrow 220, the extendable arms 96 being shifted to a more erect disposition when the rake 10 is in the working disposition of FIG. 7.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A rake having a transport disposition and a working disposition, comprising:
    a tongue assembly including an elongated shank and a pair of trailing arms angularly disposed from the elongated shank;
    a cross member shiftably, pivotally coupled to the tongue assembly, the cross member mounting a pair of rake assemblies and a wheel assembly, wherein the cross member, the pair of rake assemblies and the wheel assembly are pivotally shiftable as a collective unit relative to the tongue assembly when transitioning between the transport disposition and the working disposition;
    each of the pair of rake assemblies including a respective support beam, the respective support beam being operably coupled to a respective extendible arm operably coupled to the cross member and shiftable between a raised position and a lowered position; and
    the wheel assembly including:
        a pair of wheel support arms, each of the wheel support arms operably coupled to the cross member proximate a respective trailing arm and extending distal the support arms, and
        a pair of wheels, each wheel rotatably coupled to a respective wheel support arm,
        wherein a wheel axis is a different axis than a cross member axis,
    wherein the position of the wheels when the rake is in the transport disposition is rearward of the position of the wheels when the rake is in the working disposition, and further wherein the position of the cross member when the rake is in the transport disposition is lower than the position of the cross member when the rake is in the working disposition, and such that each respective support beam is oriented generally parallel to said tongue assembly elongated shank, thereby minimizing the envelope displaced by the rake in the transport disposition.

2. The rake of claim 1, wherein each of the pair of rake assemblies is disposable in a generally horizontal disposition when the rake is in the transport disposition, the generally horizontal disposition being effected at least in part by the pivotal shifting of the cross member relative to the tongue assembly when transitioning from the working disposition to the transport disposition.

3. The rake of claim 2, wherein each of the pair of rake assemblies has a first respective axis of rotation aligned with the pivotal shifting of the cross member relative to the tongue assembly when transitioning between the transport disposition and the working disposition.

4. The rake of claim 3, wherein the rotational shifting of the pair of rake assemblies at a pair of second axes of rotation effects in part the disposing of the rake assemblies in the generally horizontal disposition of the transport disposition.

5. The rake of claim 1, including a shift actuator capable of pivotally shifting the cross member relative to the tongue assembly.

6. The rake of claim 5, wherein the shift actuator is operably coupled to the cross member and to the tongue assembly.

7. The rake of claim 1, including a shift actuator and a first spread actuator being operably coupled to a first rake assembly and a second spread actuator being operably coupled to a second rake assembly, the shift actuator and the first and second spread actuators being serially hydraulically coupled such that hydraulic pressure may be first ported to the shift actuator and, after effecting shifting of the shift actuator, fluid exiting the shift actuator may then be ported to the respective first and second spread actuators simultaneously.

8. The rake of claim 1, wherein a selected shifting of the cross member relative to the tongue assembly acts to lower a distal end of the tongue assembly relative to the underlying ground in the transport disposition as compared to the height the distal end of the tongue assembly relative to the underlying ground when in the working disposition.

9. A rake having a transport disposition and a working disposition, comprising:
    a tongue assembly;
    a cross member assembly pivotally coupled to the tongue assembly, the cross member assembly including
        a pair of rake assemblies, each rake assembly including
            a respective support beam operably coupled to a respective extendable arm operably coupled to a cross member; and
        a wheel assembly including a pair of wheels operably coupled to a respective pair of wheel support arms, operably coupled to the cross member,
    wherein the cross member assembly is pivotally shiftable as a collective unit relative to the tongue assembly when transitioning between the transport disposition and the working disposition.

10. The rake of claim 9, wherein each of the pair of rake assemblies is disposable in a generally horizontal disposition when the rake is in the transport disposition, the generally horizontal disposition being affected at least in part by the pivotal shifting of the cross member assembly relative to the tongue assembly when transitioning from the working disposition to the transport disposition.

11. The rake of claim 10, wherein each of the pair of rake assemblies has a first respective axis of rotation aligned with the pivotal shifting of the cross member relative to the tongue assembly when transitioning between the transport disposition and the working disposition.

12. The rake of claim 11, wherein the rotational shifting of the pair of rake assemblies at a pair of second axes of rotation effects in part the disposing of the rake assemblies in the generally horizontal disposition of the transport disposition.

13. The rake of claim 9, including a shift actuator capable of pivotally shifting the cross member assembly relative to the tongue assembly.

14. The rake of claim 13, wherein the shift actuator is operably coupled to the cross member and to the tongue assembly.

15. The rake of claim 9, including a shift actuator and a first spread actuator being operably coupled to a first rake assembly and a second spread actuator being operably coupled to a second rake assembly, the shift actuator and the first and second spread actuators being serially hydraulically coupled such that hydraulic pressure may be first ported to the shift actuator and, after effecting shifting of the shift actuator, fluid exiting the shift actuator may then be ported to the respective first and second spread actuators simultaneously.

16. The rake of claim 9, wherein a selected shifting of the cross member assembly relative to the tongue assembly acts to lower a distal end of the tongue assembly relative to the underlying ground in the transport disposition as compared to the height the distal end of the tongue assembly relative to the underlying ground when in the working disposition.

* * * * *